United States Patent Office 2,812,729

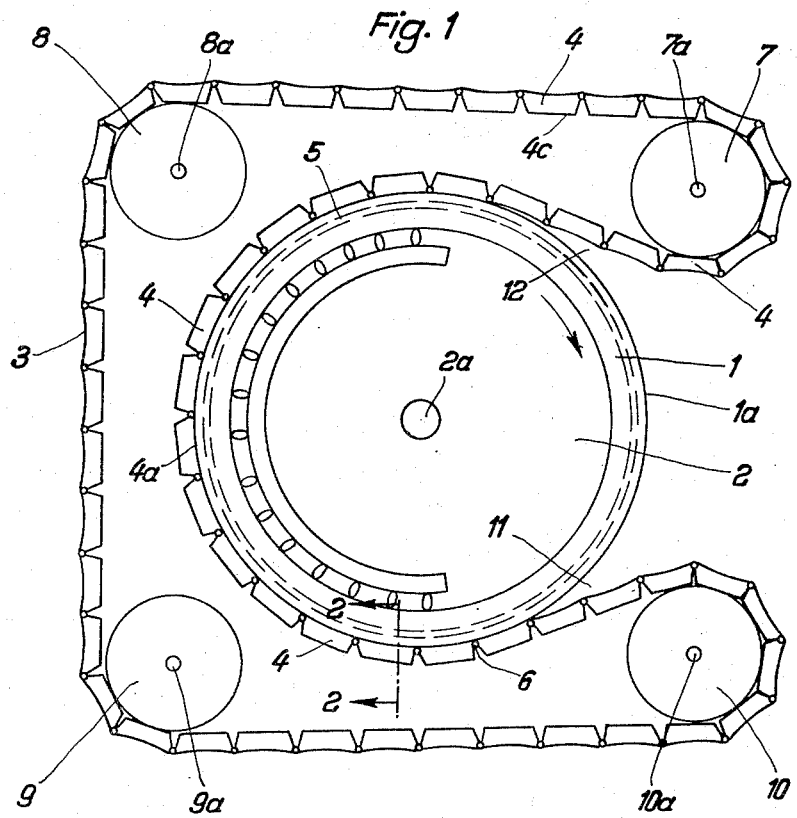
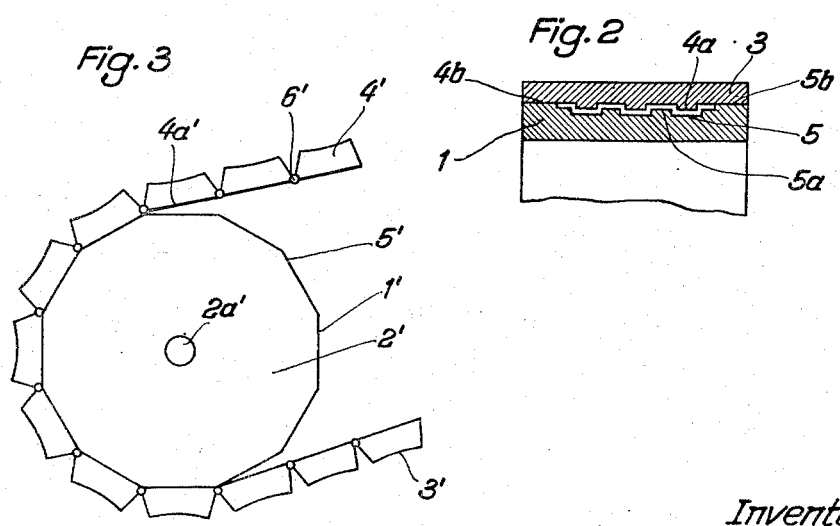

Patented Nov. 12, 1957

2,812,729

BAKING MACHINE

Werner Bahlsen, Hannover, Germany

Application May 4, 1954, Serial No. 427,621

Claims priority, application Germany May 11, 1953

12 Claims. (Cl. 107—57)

The present invention relates to baking machines, and more particularly to a baking machine in which a mold is formed between a rotary drum and a belt passing around a portion of the drum.

It is one object of the present invention to provide a continuously operating baking machine in which baked articles are continuously molded and baked.

It is another object of the present invention to provide a continuously operating baking machine in which baked articles are molded on two sides to a desired configuration.

It is a further object of the present invention to provide a continuously operating baking machine in which the mold for the baked articles is formed by a belt composed of a plurality of flexibly connected link members and a rotary drum about which the belt passes.

It is yet another object of the present invention to provide a polygonal drum having a molding surface composed of a plurality of flat recessed molding faces cooperating with corresponding molding faces of rigid flexibly connected link members of a belt passing around a portion of the polygonal drum.

With these objects in view, the present invention mainly consists in a continuously operating baking machine comprising, in combination, a rotary drum having a peripheral annular profiled molding surface, an endless belt passing around a portion of the peripheral molding surface of the rotary drum, the endless belt being composed of a plurality of flexibly connected link members, each of said link members having a profiled molding surface engaging the portion of the peripheral annular molding surface during rotation of the drum, and means for rotating the drum and for moving the belt together with the rotary drum with the molding surfaces moving at the same speed so that the engaging molding surfaces form together mold means adapted to receive a material to be baked.

The term "profiled surface" is used in the present application to denote a surface formed with projections and/or recesses.

Preferably the molding surfaces of the link members and of the rotary drum are formed with such projections and recesses as to form desired configurations on two sides of a quantity of dough molded between the molding surfaces, and baked in the machine by heating either the drum, or the belt, or both elements in a suitable manner.

According to one embodiment of the present invention the link members having molding faces bounded by rim portions engaging corresponding rim portions on the annular peripheral molding surface of the drum. The longitudinally extending rim portions of the link members are preferably concave and arcuate and have the same radius of curvature as the peripheral molding surface of the drum. If only longitudinal rim portions are provided, a continuous baked article is produced. If, however, transverse rim portions are also provided, the baked article is separated into a plurality of smaller pieces, each piece being molded between one link member and the rotary drum.

According to another embodiment of the present invention the rotary drum has a polygonal molding surface composed of a plurality of flat faces which cooperate with corresponding flat faces of the link members. In this embodiment it is sufficient to rotate the drum which takes along the belt since the engaging flat faces of the link members and of the drum constitute means for connecting the belt to the drum for simultaneous rotation.

Guide rollers are provided for guiding the endless belt. In the first-mentioned embodiment it is necessary to provide also at least one drive roller for the endless belt. According to a preferred embodiment of the present invention the rollers engage the rear faces of the link members of the belt, while the front faces of the link members engage the peripheral molding surface of the drum. Since the diameter of the rotary drum is preferably greater than the diameter of the rollers cooperating with the belt, the longitudinal section of the link members is made trapezoidal so that the rear face of each link member is shorter than the front face thereof. Consequently, the front faces of the link members can form a continuous molding surface when passing around the rotary drum, while the rear faces of the link members can form a continuous surface when passing around the rollers. Preferably, the rear faces are made arcuate and concave and have the same radius of curvature as the rollers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side view of a baking machine according to one embodiment of the present invention;

Fig. 2 is a fragmentary sectional view taken on line 2—2 of Fig. 1;

Fig. 3 is a side view of another embodiment of the present invention;

Figure 4:
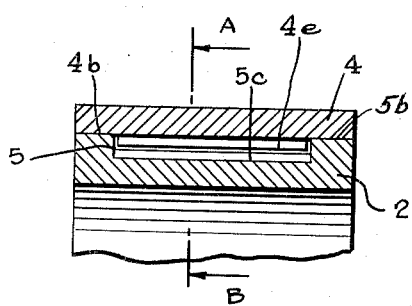
Fig. 4 is a fragmentary sectional view taken on line 2—2 in Fig. 1 and illustrating a modified embodiment.

Referring now to the drawings, and more particularly to Figs. 1 and 2, on the drive shaft 2a a rotary drum 2 is mounted which has a wall 1 whose annular peripheral surface 1a is profiled as best seen in Fig. 2. The annular peripheral surface 1a is preferably formed with recesses 5 and projections 5a which are bounded by rim portions 5b which extend circumferentially of the rotary drum 2.

A belt 3 passes around a portion of the drum 2 and is composed of a plurality of rigid link members 4 which are pivotally connected by joints 6 so that the belt 3 is flexible. Each of the link members 4 has a profiled molding surface or face 4a formed with projections and recesses as best seen in Fig. 2. The molding surfaces of the link members are bounded by rim portions 4b extending longitudinally of the belt and cooperating with the rim portions 5b of the molding surface 1a of the drum 2.

The belt 3 passes around a plurality of guide and drive rollers 7, 8, 9 and 10 which engage the rear faces 4c of the link members. Since the diameter of the rollers 7, 8, 9 and 10 is smaller than the diameter of the rotary drum 2, the rear faces 4c are shorter than the front faces 4a and the lateral rim portions 4b so that the front faces 4a form a substantially continuous surface when passing around a portion of the annular peripheral molding surface 1a.

The drive shaft 2a, and the shafts 7a, 8a, 9a, and 10a of the rollers 7, 8, 9, 10 are connected by a suitable transmission means, not shown in the drawings, so that the belt 3 moves at such speed that the rim portions 4b of the link members 4 move at the same speed as the rim portions 5b of the annular peripheral surface of the rotary drum 2. It will be understood that it is sufficient to connect only one of the rollers, for instance roller 7 to the shaft 2a, the respective roller serving as a drive roller, while the other rollers serve as guide rollers for the belt 3. The drive shaft 2a, the shaft 7a, and the transmission means, not shown, constitute means for rotating the drum 2 and for moving the belt 3.

Preferably the front faces 4a, and more particularly the rim portions 4b of the link members 4 are concave and arcuate and have the same radius of curvature as the peripheral surface 1a of the drum 2. The rear faces 4c may also be concave and arcuate and have the same radius of curvature as the drive roller 7.

Figure 6:
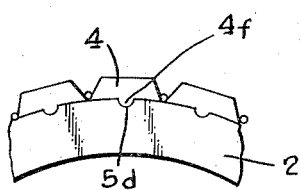
Fig. 6 is the side view of the embodiment of Fig. 5.
Figure 7:
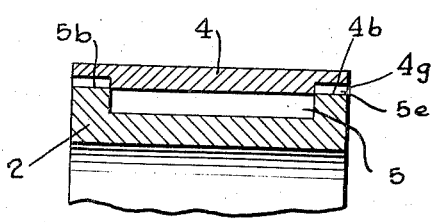
Fig. 7 is a fragmentary sectional view taken on line 2—2 of Fig. 1 illustrating a modified embodiment.
Figure 8:
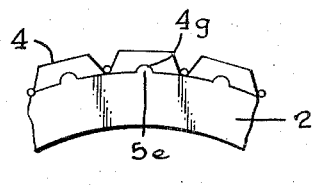
Fig. 8 is the side view of the embodiment of Fig. 7.

As shown in Figs. 5–8, it is also contemplated to use only guide rollers for the belt 3, and to connect the longitudinal rim portions 4b of the link members with corresponding rim portions 5b on the drum surface 1a by suitable means, for instance by meshing serrations 4f and 5d in Figs. 5 and 6, or 4g and 5e in Figs. 7 and 8. In this event no drive roller, but only guide rollers have to be provided for the belt 3, and the rear faces 4c of the link members can be made straight so that they slide on the guide rollers.

The profiled molding surfaces 4a and 5a together form a channel-shaped mold in which an article to be baked is formed when dough is placed between the molding surface 4a of the belt 3 and the molding surface 1a of the drum 1, for instance, at the point 11, assuming a rotation of the drum 2 in the direction of the arrow. If the dough is heated by heating means such as shown in Fig. 1 comprising an arcuate burner tube directing a multiplicity of flames on the inner face of wall 1 while moving around the drum 2, the baked article will be finished at the point 12 and can be removed.

Figure 4A:
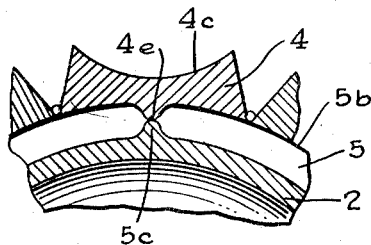
Fig. 4a is a fragmentary sectional view taken along line A—B of Fig. 4.
Figure 5:
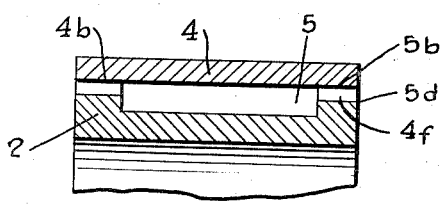
Fig. 5 is a fragmentary sectional view taken on line 2—2 in Fig. 1 and illustrating another embodiment.

If it is desired to obtain a plurality of separated baked pieces, at least one transverse rim 4e shown in Figs. 4 and 4a is provided between the rim portions 4b of each link member, the transverse rim portions preferably engaging corresponding transverse rims 5c on the peripheral surface of the drum 2 so that separate molds are formed by each link member and by the corresponding surface portion of the rotary drum.

Referring now to Fig. 3 which shows a modified embodiment of the present invention, the polygonal drum 2' has a peripheral molding surface 1' which is composed of a plurality of molding faces 5', each molding face being formed with projections and recesses. A belt 3' passes around a portion of the polygonal drum 2', and is composed of a plurality of link members 4', which are connected by joints 6'. Each link member has a flat molding face 4a' formed with suitable projections and recesses so that the molding faces 5' and the molding faces 4a' together form mold means. When the drive means, namely shaft 2a rotates, the belt 3' is taken along since the flat faces 5' and 4a' connect the belt to the rotary drum 2' for movement therewith. Similar to the embodiment shown in Figs. 4 and 4a, longitudinal and transverse rim portions may be provided on the cooperating faces of the link member and of the polygonal drum. The longitudinal section of the link members is preferably trapezoidal, and the rear faces of the link members are straight as shown in Figs. 6 and 8 if only guide rollers are used for the belt.

It will be understood that each of the elements described above, or two or more together, may also find a useful application in other types of baking machines differing from the types described above.

While the invention has been illustrated and described as embodied in a baking machine comprising a rotary drum and a belt composed of a plurality of link members cooperating with the peripheral surface of the drum to form a baking mold, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a continuously operating baking machine, in combination, a rotary drum having a peripheral annular profiled molding surface; an endless belt passing around a portion of said peripheral molding surface of said rotary drum, said endless belt being composed of a plurality of flexibly connected link members, each of said link members having a profiled molding surface bounded by lateral rim portions extending in a longitudinal direction of said belt, and having at least one transverse rim portion, said rim portions engaging said peripheral annular molding surface during rotation of said drum; and means for rotating said drum and for moving said belt together with said rotary drum with said molding surfaces moving at the same speed so that the engaging molding surfaces form together a plurality of molds adapted to receive a material to be baked.

2. In a continuously operating baking machine, in combination, a rotary drum having a peripheral annular profiled molding surface; an endless belt passing around a portion of said peripheral molding surface of said rotary drum, said endless belt being composed of a plurality of flexibly connected rigid link members, each of said link members having an arcuate molding surface provided with a recess bounded by longitudinal arcuate concave rim portions having the same radius of curvature as said peripheral molding surface of said drum and engaging the same; and means for rotating said drum and for moving said belt together with said rotary drum with said molding surfaces moving at the same speed so that the engaging molding surfaces form together a mold means adapted to receive a material to be baked.

3. In a continuously operating baking machine, in combination, a rotary polygonal drum having a peripheral annular molding surface composed of a plurality of flat profiled molding faces; an endless belt passing around a portion of said peripheral molding surface of said rotary drum, said endless belt being composed of a plurality of flexibly connected rigid link members, each of said link members having a profiled molding surface engaging one of said molding faces of said portion of said peripheral annular molding surface during rotation of said drum; and means for rotating said drum and for moving said belt together with said rotary drum with said molding surfaces moving at the same speed so that each of said molding surfaces of said link members and the molding face of said drum engaged thereby form together a mold adapted to receive a material to be baked.

4. In a continuously operating baking machine, in combination, a rotary drum having a peripheral annular profiled recessed molding surface; an endless belt passing around a portion of said peripheral molding surface of said rotary drum, said endless belt being composed of a plurality of flexibly connected rigid link members, each of said link members having an arcuate molding surface provided with a recess bounded by longitudinal arcuate concave rim portions having the same radius of curvature as said peripheral molding surface of said drum and engaging the same; and means for rotating said drum and for moving said belt together with said rotary drum with said molding surfaces moving at the same speed so that the engaging molding surfaces form together mold means adapted to receive a material to be baked.

5. In a continuously operating baking machine, in combination, a rotary polygonal drum having a peripheral annular molding surface formed with a plurality of circumferential recesses providing a plurality of molding faces; an endless belt passing around a portion of said peripheral molding surface of said rotary drum, said endless belt being composed of a plurality of flexibly connected link members, each of said link members having a recessed molding surface engaging one of said molding faces of said portion of said peripheral annular molding surface during rotation of said drum; and means for rotating said drum and for moving said belt together with said rotary drum with said molding surfaces moving at the same speed so that each of said molding surfaces of said link members and the molding face of said drum engaged thereby form together a mold adapted to receive a material to be baked.

6. In a continuously operating baking machine, in combination, a rotary drum having a peripheral annular profiled molding surface; an endless belt passing around a portion of said peripheral molding surface of said rotary drum, said endless belt being composed of a plurality of pivotally connected link members, each of said link members having a profiled molding front face engaging said portion of said peripheral molding surface of said drum, and a rear face being shorter in a longitudinal direction of said belt than said front face of said link member so that said link members have a substantially trapezoid longitudinal section; rollers engaging said rear faces of said link members of said endless belt, the diameter of said rollers being smaller than the diameter of said rotary drum so that said front faces of said link members form a continuous surface when passing around said peripheral molding surface of said drum, and so that said shorter rear faces of said link members form a continuous surface when passing around said rollers; and means for rotating said drum and said rollers with said molding front faces of said link members moving at the same speed as said peripheral molding surface of said rotary drum so that said molding front faces of said link members, and said molding surface of said drum form together mold means adapted to receive dough to be baked.

7. In a continuously operating baking machine, in combination, a rotary drum having a peripheral annular profiled recessed molding surface; an endless belt passing around a portion of said peripheral molding surface of said rotary drum, said endless belt being composed of a plurality of pivotally connected link members, each of said link members having a profiled molding front face bounded by lateral rim portions extending in a longitudinal direction of said belt and engaging said portion of said peripheral molding surface of said drum, and a rear face being shorter in the longitudinal direction of said belt than said front face of said link member so that said link members have a substantially trapezoid longitudinal section; rollers engaging said rear faces of said link members of said endless belt, the diameter of said rollers being smaller than the diameter of said rotary drum so that said front faces of said link members form a continuous surface when passing around said peripheral molding surface of said drum, and so that said shorter rear faces of said link members form a continuous surface when passing around said rollers; and means for rotating said drum and said rollers with said molding front faces of said link members moving at the same speed as said peripheral molding surface of said rotary drum so that said molding front faces of said link members, and said molding surface of said drum form together mold means adapted to receive dough to be baked.

8. In a continuously operating baking machine, in combination, a rotary drum having a peripheral annular profiled recessed molding surface; an endless belt passing around a portion of said peripheral molding surface of said rotary drum, said endless belt being composed of a plurality of pivotally connected link members, each of said link members having a profiled molding front face bounded by concave arcuate rim portions extending in a longitudinal direction of said belt and having the same radius of curvature as said molding surface of said rotary drum, said rim portions engaging said portion of said peripheral molding surface of said drum, and a rear face being shorter in the longitudinal direction of said belt than said front face of said link member so that said link members have a substantially trapezoid longitudinal section; rollers engaging said rear faces of said link members of said endless belt, the diameter of said rollers being smaller than the diameter of said rotary drum so that said front faces of said link members form a continuous surface when passing around said peripheral molding surface of said drum, and so that said shorter rear faces of said link members form a continuous surface when passing around said rollers; and means for rotating said drum and said rollers with said molding front faces of said link members moving at the same speed as said peripheral molding surface of said rotary drum so that said molding front faces of said link members, and said molding surface of said drum form together mold means adapted to receive dough to be baked.

9. A continuous baking machine comprising, in combination, a rotary polygonal drum having a peripheral annular molding surface formed with a plurality of circumferential recesses providing a plurality of molding faces bounded by lateral straight rim portions extending in a circumferential direction of said drum; an endless belt passing around a portion of said peripheral molding surface of said rotary drum, said endless belt being composed of a plurality of pivotally connected link members, each of said link members having a recessed molding face bounded by lateral straight rim portions extending in a longitudinal direction of said belt and engaging said rim portions of said molding faces of said drum; and means for rotating said drum and for moving said belt with said rim portions of said link members and of said rotary drum moving at the same speed so that said molding faces of said link members and of said drum form together mold means adapted to receive dough to be baked.

10. A continuous baking machine comprising, in combination, a rotary polygonal drum having a peripheral annular molding surface formed with a plurality of circumferential recesses providing a plurality of molding faces bounded by lateral straight rim portions extending in a circumferential direction of said drum; an endless belt passing around a portion of said peripheral molding surface of said rotary drum, said endless belt being composed of a plurality of pivotally connected link members, each of said link members having a recessed molding face bounded by lateral straight rim portions extending in a longitudinal direction of said belt and engaging said rim portions of said molding faces of said drum; and means for rotating said drum whereby said belt is moved with said drum due to the engagement of said molding faces of said drum and of said link members so that said molding faces of said link members and of said drum form together mold means adapted to receive dough to be baked.

11. A continuous baking machine comprising, in combination, a rotary polygonal drum having a peripheral annular molding surface formed with a plurality of circumferential recesses providing a plurality of molding faces bounded by lateral straight rim portions extending in a circumferential direction of said drum and by at least one transverse rim portion; an endless belt passing around a portion of said peripheral molding surface of said rotary drum, said endless belt being composed of a plurality of pivotally connected link members, each of said link members having a recessed molding face bounded by lateral straight rim portions extending in a longitudinal direction of said belt and by at least one transverse rim portion, said rim portions of said link members engaging said rim portions of said molding faces of said drum; and means for rotating said drum whereby said belt is moved with said drum due to the engagement of said molding faces of said drum and of said link members so that said molding faces of said link members and of said drum form together a plurality of molds adapted to receive dough to be baked.

12. A baking machine as claimed in claim 6 wherein said rear faces of said link members are concave and are arcuate and have the same radius of curvature as said rollers.

References Cited in the file of this patent

UNITED STATES PATENTS

| | | |
|---|---|---|
| 562,962 | Holmes | June 30, 1896 |
| 1,465,326 | Zimmer | Aug. 21, 1923 |
| 1,967,565 | Thurlings | July 24, 1934 |

FOREIGN PATENTS

| | | |
|---|---|---|
| 21,816 | Great Britain | Oct. 3, 1906 |